US012627001B2

(12) United States Patent　　(10) Patent No.:　US 12,627,001 B2
Kwon et al.　　　　　　　　　　　　(45) Date of Patent:　　May 12, 2026

(54) SEPARATOR FOR LITHIUM SECONDARY BATTERY, THE METHOD FOR MANUFACTURING THE SAME AND LITHIUM SECONDARY BATTERY INCLUDING THE SAME

(71) Applicant: LG ENERGY SOLUTION, LTD., Seoul (KR)

(72) Inventors: Hye-Jin Kwon, Daejeon (KR); Kyung-Ryun Ka, Daejeon (KR); Seung-Hyun Lee, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 596 days.

(21) Appl. No.: 18/014,417

(22) PCT Filed: Sep. 29, 2021

(86) PCT No.: PCT/KR2021/013399
　§ 371 (c)(1),
　(2) Date: Jan. 4, 2023

(87) PCT Pub. No.: WO2022/071775
　PCT Pub. Date: Apr. 7, 2022

(65)　　　　Prior Publication Data
　US 2023/0307789 A1　　Sep. 28, 2023

(30)　　Foreign Application Priority Data

Sep. 29, 2020　(KR) ........................ 10-2020-0127233
　Sep. 29, 2020　(KR) ........................ 10-2020-0127237

(51) Int. Cl.
　*H01M 2/14*　　　　(2006.01)
　*H01M 10/052*　　(2010.01)
　　　　　(Continued)

(52) U.S. Cl.
　CPC ....... *H01M 50/446* (2021.01); *H01M 10/052* (2013.01); *H01M 50/403* (2021.01); *H01M 50/457* (2021.01)

(58) Field of Classification Search
　CPC .. H01M 50/446; H01M 50/443; H01M 50/44; H01M 50/449; H01M 50/403;
　　　　　　(Continued)

(56)　　　　References Cited

U.S. PATENT DOCUMENTS

2008/0292968 A1　11/2008　Lee et al.
2012/0094184 A1　4/2012　Abe et al.
　　　　　(Continued)

FOREIGN PATENT DOCUMENTS

CN　　103633271 A　*　3/2014　.......... H01M 50/446
CN　　109411673 A　　3/2019
　　　　　(Continued)

OTHER PUBLICATIONS

Engligh translation of CN-103633271) Zhang et al., "Battery Separator With Z-direction Stability", Mar. 12, 2014.*

(Continued)

*Primary Examiner* — Raymond Alejandro

(74) *Attorney, Agent, or Firm* — Birch, Stewart, Kolasch & Birch, LLP

(57)　　　　　ABSTRACT

A separator for a lithium secondary battery, a method for manufacturing the same, and a secondary battery including the same. The separator includes a porous coating layer including a top layer, an intermediate layer, and a bottom layer. An amount of a particle-type binder polymer present (Continued)

in the top layer is larger than an amount of the particle-type binder polymer present in the bottom layer. The porous coating layer also includes a dispersant having a carboxyl group and a glycol group.

20 Claims, 3 Drawing Sheets

(51) Int. Cl.
*H01M 50/403* (2021.01)
*H01M 50/446* (2021.01)
*H01M 50/457* (2021.01)

(58) Field of Classification Search
CPC ............. H01M 50/409; H01M 50/411; H01M 50/457; H01M 10/052; H01M 10/0525
See application file for complete search history.

(56) References Cited

U.S. PATENT DOCUMENTS

| | | | |
|---|---|---|---|
| 2013/0302661 A1 | 11/2013 | Kim et al. | |
| 2014/0308565 A1 | 10/2014 | Lee et al. | |
| 2016/0204406 A1 | 7/2016 | Ryu et al. | |
| 2018/0034025 A1 | 2/2018 | Lee et al. | |
| 2019/0237732 A1* | 8/2019 | Hu ...................... | H01M 50/417 |
| 2021/0057698 A1 | 2/2021 | Sung et al. | |
| 2021/0265702 A1* | 8/2021 | Yao ..................... | H01M 50/426 |
| 2021/0280945 A1 | 9/2021 | Kim et al. | |

FOREIGN PATENT DOCUMENTS

| | | | |
|---|---|---|---|
| JP | 2016-72150 A | 5/2016 | |
| JP | 2018-73842 A | 5/2018 | |
| KR | 20-0398477 Y1 | 10/2005 | |
| KR | 10-0727247 B1 | 6/2007 | |
| KR | 10-2012-0023078 A | 3/2012 | |
| KR | 10-2013-0126445 A | 11/2013 | |
| KR | 10-2014-0050877 A | 4/2014 | |
| KR | 10-2014-0124321 A | 10/2014 | |
| KR | 10-2015-0052800 A | 5/2015 | |
| KR | 10-2016-0023317 A | 3/2016 | |
| KR | 10-2016-0129762 A | 11/2016 | |
| KR | 10-2018-0041137 A | 4/2018 | |
| KR | 10-2019-0042576 A | 4/2019 | |
| KR | 10-2020-0036648 A | 4/2020 | |
| KR | 10-2020-0056337 A | 5/2020 | |
| KR | 10-2020-0085671 A | 7/2020 | |
| WO | WO 2020/000164 A1 | 1/2020 | |

OTHER PUBLICATIONS

International Search Report (PCT/ISA/210) issued in PCT/KR2021/013399, dated Jan. 24, 2022.

* cited by examiner

SEPARATOR FOR LITHIUM SECONDARY BATTERY, THE METHOD FOR MANUFACTURING THE SAME AND LITHIUM SECONDARY BATTERY INCLUDING THE SAME

TECHNICAL FIELD

The present disclosure relates to a separator applicable to an electrochemical device, such as a lithium secondary battery, a method for manufacturing the same, and a lithium secondary battery including the same.

The present application claims priority to Korean Patent Application No. 10-2020-0127233 filed on Sep. 29, 2020 and Korean Patent Application No. 10-2020-0127237 filed on Sep. 29, 2020 in the Republic of Korea, the disclosures of which are incorporated herein by reference.

BACKGROUND ART

Recently, energy storage technology has been given an increasing attention. Efforts into research and development for electrochemical devices have been actualized more and more, as the application of energy storage technology has been extended to energy for cellular phones, camcorders and notebook PC and even to energy for electric vehicles. In this context, electrochemical devices have been most spotlighted. Among such electrochemical devices, development of rechargeable secondary batteries has been focused. More recently, active studies have been conducted about designing a novel electrode and battery in order to improve the capacity density and specific energy in developing such batteries.

Among the commercially available secondary batteries, lithium secondary batteries developed in the early 1990's have been spotlighted, since they have a higher operating voltage and significantly higher energy density as compared to conventional batteries, such as Ni-MH, Ni-Cd and sulfuric acid-lead batteries using an aqueous electrolyte.

Although such electrochemical devices have been produced from many production companies, safety characteristics thereof show different signs. Evaluation and securement of safety of such electrochemical devices are very important. For example, a separator prevents a short-circuit between a positive electrode and a negative electrode and provides a channel for transporting lithium ions. Therefore, such a separator is an important element affecting the safety and output characteristics of a battery.

Such a separator frequently includes a polyolefin-based porous polymer substrate. In order to prevent the porous polymer substrate from heat shrinking and to enhance adhesion to an electrode, there has been frequently used a separator provided with a porous coating layer including inorganic particles and a binder polymer on at least one surface of a porous polymer substrate.

The separators may be classified broadly into aqueous coating separators using an aqueous solvent and organic coating separators using an organic solvent, depending on the porous coating layer. Particularly, the aqueous coating separators allow uniform thin film coating and show high heat resistance.

However, there is still a need for a separator showing increased adhesion (Lami strength) to an electrode, while maintaining high porosity in the porous coating layer.

DISCLOSURE

Technical Problem

The present disclosure is designed to solve the problems of the related art, and therefore the present disclosure is directed to providing an aqueous coating separator which has excellent heat resistance, includes a porous coating layer having high porosity and shows improved adhesion to an electrode, a method for manufacturing the same, and a lithium secondary battery including the same.

However, objects to be accomplished by the present disclosure are not limited to the above-mentioned problem, and other objects of the present disclosure may be understood from the following detailed description and will become more fully apparent from the exemplary embodiments of the present disclosure.

Technical Solution

In one aspect of the present disclosure, there is provided a separator for a lithium secondary battery, a method for manufacturing the same and a lithium secondary battery including the same according to any one of the following embodiments.

According to the first embodiment, there is provided a separator for a lithium secondary battery, including:

a porous polymer substrate; and a porous coating layer on at least one surface of the porous polymer substrate, wherein the porous coating layer includes inorganic particles, a particle-type binder polymer and a dispersant, wherein the dispersant includes a carboxyl group and a glycol group, wherein the porous coating layer includes a top layer, an intermediate layer and a bottom layer in the thickness direction, and wherein an amount of the particle-type binder polymer present in the top layer is higher than an amount of the particle-type binder polymer present in the bottom layer.

According to the second embodiment, there is provided the separator for a lithium secondary battery as defined in the first embodiment, wherein the top layer is the outermost layer of the porous coating layer, when the porous coating layer is viewed in the thickness direction away from the porous polymer substrate; wherein the bottom layer faces the porous polymer substrate, when the porous coating layer is viewed in the thickness direction; wherein the intermediate layer is between the top layer and the bottom layer in the porous coating layer; and wherein n is an integer of 3 to 10.

According to the third embodiment, there is provided the separator for a lithium secondary battery as defined in the first or the second embodiment, wherein a concentration gradient of the particle-type binder polymer increases from the bottom layer to the top layer in the thickness direction of the porous coating layer, and a concentration gradient of the inorganic particles increases from the top layer to the bottom layer in the thickness direction of the porous coating layer.

According to the fourth embodiment, there is provided the separator for a lithium secondary battery as defined in any one of the first to the third embodiments, wherein the intermediate layer in the porous coating layer has a gradual concentration gradient of the particle-type binder polymer, or has no specific concentration gradient.

According to the fifth embodiment, there is provided the separator for a lithium secondary battery as defined in any one of the first to the fourth embodiments, wherein the weight ratio of the inorganic particles to the dispersant is 99.5:0.5-95:5.

According to the sixth embodiment, there is provided the separator for a lithium secondary battery as defined in any one of the first to the fifth embodiments, wherein the amount of the particle-type binder polymer is 10 parts by weight to 50 parts by weight based on 100 parts by weight of the porous coating layer.

According to the seventh embodiment, there is provided the separator for a lithium secondary battery as defined in any one of the first to the sixth embodiments, wherein the dispersant has a ratio of the equivalent number of glycol groups to an equivalent number of carboxyl groups of 0.05 to 0.25.

According to the eighth embodiment, there is provided the separator for a lithium secondary battery as defined in any one of the first to the seventh embodiments, wherein the dispersant has a weight average molecular weight of 100-10,000.

According to the ninth embodiment, there is provided the separator for a lithium secondary battery as defined in any one of the first to the eighth embodiments, wherein the dispersant is a copolymer of polyacrylic acid with polyethylene glycol.

According to the tenth embodiment, there is provided the separator for a lithium secondary battery as defined in the ninth embodiment, wherein the dispersant is a block copolymer of polyacrylic acid with polyethylene glycol.

According to the eleventh embodiment, there is provided the separator for a lithium secondary battery as defined in any one of the first to the tenth embodiments, wherein the porous coating layer has a thickness of 2-10 μm.

According to the twelfth embodiment, there is provided the separator for a lithium secondary battery as defined in any one of the first to the eleventh embodiments, wherein the inorganic particles are sheet-like inorganic particles.

According to the thirteenth embodiment, there is provided the separator for a lithium secondary battery as defined in the twelfth embodiment, wherein the sheet-like inorganic particles have an aspect ratio of 3.5 or more.

According to the fourteenth embodiment, there is provided the separator for a lithium secondary battery as defined in the twelfth embodiment, wherein the sheet-like inorganic particles include at least one of $Al(OH)_3$, $AlO$ $(OH)$, $Mg(OH)_2$ and $BaTiO_3$.

According to the fifteenth embodiment, there is provided a method for manufacturing the separator for a lithium secondary battery as defined in any one of the first to the fourteenth embodiments, the method including a step of applying slurry for forming a porous coating layer containing a solvent, inorganic particles, a particle-type binder polymer and a dispersant to at least one surface of a porous polymer substrate, followed by drying, wherein the slurry for forming a porous coating layer has a viscosity of 200 cP or less, and the slurry for forming a porous coating layer has a solid content of 10-40 parts by weight based on 100 parts by weight of the slurry.

According to the sixteenth embodiment, there is provided the method for manufacturing the separator for a lithium secondary battery as defined in the fifteenth embodiment, wherein the solvent is water, the particle-type binder polymer is in the form of particles dispersed in the solvent, and phase separation is carried out in the drying step.

According to the seventeenth embodiment, there is provided the method for manufacturing the separator for a lithium secondary battery as defined in the fifteenth or the sixteenth embodiment, wherein the separator satisfies at least three the following formulae:

increase in air permeation time≤100% heat shrinkage≤10% adhesion to electrode≥70 gf/25 mm viscosity of slurry for forming porous coating layer≤20 cp, wherein the increase in air permeation time is calculated by the formula of [air permeation time of porous polymer substrate−air permeation time of separator)/(air permeation time of porous polymer substrate)]×100, and wherein the heat shrinkage is a smaller value of the heat shrinkage in the machine direction (MD) and the heat shrinkage in the transverse direction (TD), and is calculated by the formula of [(initial length−length after heat shrinking at 150° C./min for 30 minutes)/(initial length)]×100.

In another aspect of the present disclosure, there is provided a lithium secondary battery according to the following embodiment.

According to the eighteenth embodiment, there is provided a lithium secondary battery including a positive electrode, a negative electrode and a separator interposed between the positive electrode and the negative electrode, wherein the separator is the same as defined in any one of the first to the fourteenth embodiments.

Advantageous Effects

According to an embodiment of the present disclosure, there are provided a separator having improved heat resistance and adhesion (Lami strength) to an electrode by using a dispersant having predetermined properties, and a lithium secondary battery including the separator.

Particularly, according to an embodiment of the present disclosure, a dispersant having predetermined properties is used to induce interlayer separation between inorganic particles and a particle-type binder polymer in slurry for forming a porous coating layer. Therefore, it is possible to provide a separator in which the porous coating layer adjacent to a porous polymer substrate is enriched with inorganic particles, and the outermost portion of the porous coating layer is enriched with the particle-type binder polymer.

Since the inorganic particles are distributed predominantly at the side of the porous polymer substrate, it is possible to inhibit the porous polymer substrate from shrinking, resulting in improvement of the heat resistance of the separator.

Meanwhile, since the particle-type binder polymer is distributed predominantly on the surface of the porous coating layer, it is possible to improve the adhesion to an electrode.

In addition, according to an embodiment of the present disclosure, it is possible to increase the porosity of the porous coating layer by using sheet-like inorganic particles having predetermine properties in the separator according to the present disclosure. Particularly, according to an embodiment of the present disclosure, low-viscosity slurry for forming a porous coating layer is applied onto the porous polymer substrate. When using such low-viscosity slurry, the packing density of the sheet-like inorganic particles is decreased. Therefore, when the solvent in the slurry is dried, the sheet-like inorganic particles show an increased degree of migration. As a result, the sheet-like inorganic particles may be arranged more randomly in the porous coating layer, and the porosity of the porous coating layer may be increased.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing. Meanwhile, shapes, sizes, scales or proportions of some constitutional elements in the drawings may be exaggerated for the purpose of clearer description.

BEST MODE

Figure 1:
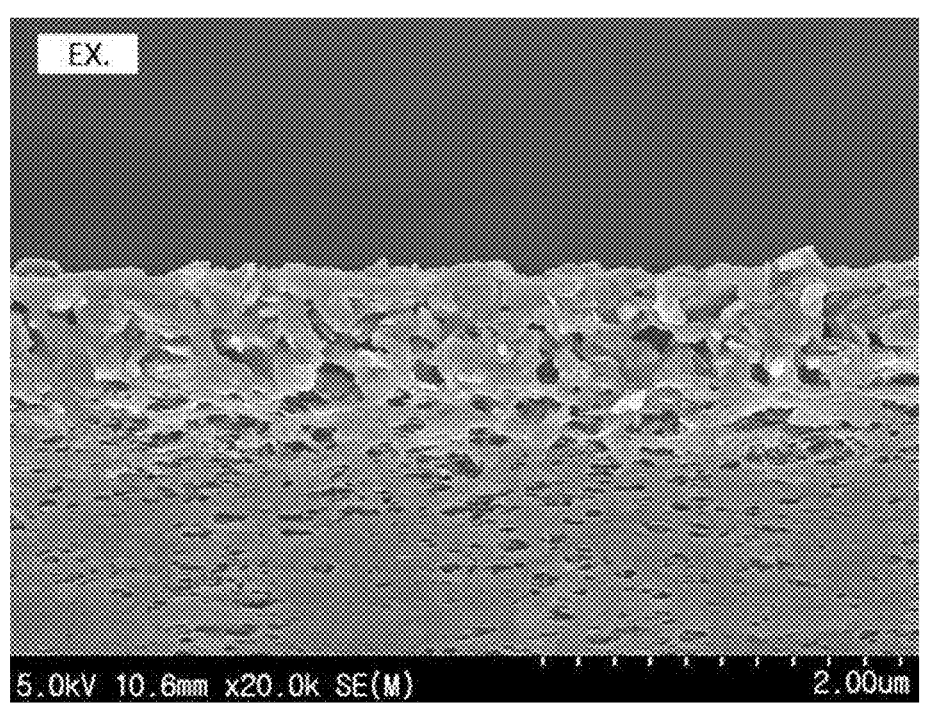
FIG. 1 is a scanning electron microscopic (SEM) image of the separator according to Example 1.

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

Throughout the specification, the expression 'a part includes an element' does not preclude the presence of any additional elements but means that the part may further include the other elements.

As used herein, the expression 'A and/or B' means 'A, B or both of them'.

Specific terms used in the following description are for illustrative purposes and are not limiting. Such terms as 'right' and 'left' show the directions in the drawings to which they are referred. Such terms include the above-listed words, derivatives thereof and words having similar meanings.

In an electrochemical device, such as a lithium secondary battery, a separator generally uses a porous polymer substrate, and thus is problematic in that it shows a heat shrinking behavior. Therefore, a porous coating layer has been introduced in order to reduce the heat shrinkage of the separator.

Although such a separator may ensure heat resistance through the inorganic particles contained in the porous coating layer, it is required for a separator to further ensure safety, as the energy density of a currently developed electrode assembly increases gradually.

Particularly, in the case of an aqueous porous coating layer having high adhesion to an electrode even with no separate adhesive layer, there has been an attempt to improve heat resistance, while enhancing adhesion to an electrode.

To solve the above-mentioned problem, the inventors of the present disclosure use a dispersant having predetermined properties to induce interlayer separation between inorganic particles and a particle-type binder polymer in slurry for forming a porous coating layer. In this manner, the present disclosure is directed to providing a separator in which the porous coating layer adjacent to a porous polymer substrate is enriched with inorganic particles, and the outermost portion of the porous coating layer is enriched with the particle-type binder polymer.

Since the inorganic particles are distributed predominantly at the side of the porous polymer substrate as mentioned above, it is possible to inhibit the porous polymer substrate from shrinking, resulting in improvement of the heat resistance of the separator.

Meanwhile, since the particle-type binder polymer is distributed predominantly on the surface of the porous coating layer, it is possible to improve the adhesion to an electrode.

In one aspect of the present disclosure, there is provided a separator for a lithium secondary battery, including:

a porous polymer substrate; and a porous coating layer formed on at least one surface of the porous polymer substrate, and including inorganic particles, a particle-type binder polymer and a dispersant, wherein the dispersant includes a carboxyl group and a glycol group, and when the porous coating layer is divided into a top layer, an intermediate layer and a bottom layer in the thickness direction, the content of the particle-type binder polymer in the top layer is higher than the content of the particle-type binder polymer in the bottom layer.

Hereinafter, the separator for a lithium secondary battery according to an embodiment of the present disclosure will be explained in more detail.

The separator for a lithium secondary battery according to an embodiment of the present disclosure includes inorganic particles, a particle-type binder polymer and a dispersant having predetermined properties, in its porous coating layer.

The dispersant includes a carboxyl group and a glycol group, as functional groups.

The carboxyl group can disperse the inorganic particles effectively, and the glycol group can reduce the surface tension of the slurry for forming a porous coating layer, can form pores of the porous coating layer with ease, and can reduce the viscosity of the slurry. If the dispersant does not include any one of carboxyl group and glycol group, it is difficult to form a porous coating layer, or the resultant separator shows poor physical properties in terms of adhesion and heat shrinking.

When introducing the dispersant together with inorganic particles and a particle-type binder polymer, the dispersant reduces the viscosity of slurry for forming a porous coating layer, and thus maximizes a difference in density between the particle-type binder polymer and the inorganic particles. Therefore, it is possible to provide a separator in which the porous coating layer adjacent to the porous polymer substrate is enriched with inorganic particles, and the outermost portion of the porous coating layer is enriched with the particle-type binder polymer.

If a dissolved binder, not the particle-type binder, is introduced together with inorganic particles, the dissolved binder is present at the portion of the porous coating layer adjacent to the porous substrate. Therefore, unlike introduction of the particle-type binder, introduction of the dissolved binder hardly ensures adhesion to an electrode.

According to an embodiment of the present disclosure, the dispersant may be a copolymer of polyacrylic acid with polyethylene glycol. Particularly, the dispersant may be a block copolymer of polyacrylic acid with polyethylene glycol.

According to an embodiment of the present disclosure, the equivalent number ratio of glycol groups to carboxyl groups (i.e. ratio of the equivalent number of glycol groups/equivalent number of carboxyl groups) may be 0.05-0.25. The dispersant according to the present disclosure is used for dispersing inorganic particles and may have a carboxyl group content of 80% or more.

According to an embodiment of the present disclosure, the dispersant may have a weight average molecular weight of 100 or more, 200 or more, or 300 or more, and 10,000 or less, 9,000 or less, or 8,000 or less. For example, the dispersant may have a weight average molecular weight of 100-10,000 with a view to ensuring processability as well as heat resistance and adhesive property.

Herein, the weight average molecular weight of the dispersant may be determined by using gel permeation chromatography (GPC) (PL GPC220, Agilent Technologies).

Particularly, the weight average molecular weight of the dispersant may be determined under the following analysis conditions:

Column: PL MiniMixed B×2
Solvent: DMF
Flow rate: 0.3 mL/min
Sample concentration: 2.0 mg/mL
Injection amount: 10 μL
Column temperature: 40° C.
Detector: Agilent RI detector
Standard: Polystyrene (corrected with tertiary function)
Data processing: ChemStation According to an embodiment of the present disclosure, the weight ratio of the inorganic particles to the dispersant may be 99.5:0.5-95:5.

According to the present disclosure, there is no particular limitation in the inorganic particles, as long as they are electrochemically stable. In other words, there is no particular limitation in the inorganic particles that may be used herein, as long as they cause no oxidation and/or reduction in the range (e.g. 0-5 V based on $Li/Li^+$) of operating voltage of an applicable electrochemical device. Particularly, when using inorganic particles having a high dielectric constant, it is possible to improve the ion conductivity of an electrolyte by increasing the dissociation degree of an electrolyte salt, such as a lithium salt, in a liquid electrolyte.

For the above-mentioned reasons, the inorganic particles may be inorganic particles having a dielectric constant of 5 or more, inorganic particles having lithium-ion transportability or a mixture thereof.

The inorganic particles having a dielectric constant of 5 or more may include any one selected from the group consisting of $Al_2O_3$, $SiO_2$, $ZrO_2$, AlO(OH), $Al(OH)_3$, $TiO_2$, $BaTiO_3$, $Pb(Zr_xTi_{1-x})$ $O_3$ (PZT, wherein 0<x<1), $Pb_{1-x}La_xZr_{1-y}Ti_yO_3$ (PLZT, wherein 0<x<1, 0<y<1), (1-x)$Pb(Mg_{1/2}Nb_{2/3})$ $O_{3-x}PbTiO_3$ (PMN-PT, wherein 0<x<1), hafnia ($HfO_2$), $SrTiO_3$, $SnO_2$, $CeO_2$, MgO, NiO, CaO, ZnO, SiC, or a mixture of two or more of them.

The inorganic particles having lithium-ion transportability may be any one selected from the group consisting of include lithium phosphate ($Li_3PO_4$), lithium titanium phosphate ($Li_xTi_y(PO_4)_3$, 0<x<2, 0<y<3), lithium aluminum titanium phosphate ($Li_xAl_yTi_z(PO_4)_3$, 0<x<2, 0<y<1, 0<z<3), $(LiAlTiP)_xO_y$-based glass (0<x<4, 0<y<13), lithium lanthanum titanate ($Li_xLa_yTiO_3$, 0<x<2, 0<y<3), lithium germanium thiophosphate ($Li_xGe_yP_zS_w$, 0<x<4, 0<y<1, 0<z<1, 0<w<5), lithium nitride ($Li_xN_y$, 0<x<4, 0<y<2), $SiS_2$-based glass ($Li_xSi_yS_z$, 0<x<3, 0<y<2, 0<z<4) and $P_2S_5$-based glass ($Li_xP_yS_z$, 0<x<3, 0<y<3, 0<z<7), or a mixture of two or more of them.

In addition, there is no particular limitation in the average particle diameter of the inorganic particles. However, the inorganic particles preferably have an average particle diameter of 0.001-10 μm in order to form a coating layer with a uniform thickness and to provide suitable porosity. The average particle diameter of the inorganic particles may be preferably 100 nm to 2 μm, more preferably 150 nm to 1 μm.

The inorganic particles may be added after they are pulverized in advance to a predetermined average particle diameter. Otherwise, the inorganic particles may be added to a binder polymer solution, and then pulverized and dispersed, while controlling them to have a predetermined diameter by using a ball milling process, or the like.

According to an embodiment of the present disclosure, the inorganic particles may be sheet-like inorganic particles. When using sheet-like inorganic particles, there is an advantage in that an increase in air permeation time may be reduced as compared to spherical inorganic particles. In addition, according to an embodiment of the present disclosure, it is possible to increase the porosity of the porous coating layer by using sheet-like inorganic particles having a high aspect ratio.

As used herein, 'sheet-like inorganic particles' refers to particles having two planar surfaces facing each other or opposite to each other and showing a longer diameter (transverse width) larger than the thickness. Hereinafter, the sheet-like inorganic particles that may be used according to the present disclosure will be explained in detail.

(1) Longer Diameter, Thickness

The sheet-like inorganic particles may have a longer diameter (transverse width) of 0.5 μm or more, 0.6 μm or more, or 0.7 μm or more, and 1.5 μm or less, 1.3 μm or less, or 1.2 μm or less.

Herein, the sheet-like inorganic particles may have a thickness of 0.05 μm or more, 0.1 μm or more, or 0.15 μm or more, and 0.3 μm or less, 0.2 μm or less, or 0.1 μm or less. When the sheet-like particles satisfy both the above-defined longer diameter range and thickness range, it is possible to form a desired separator having high porosity.

Herein, the method for measuring the longer diameter and the thickness may include: 1) calculating the arithmetic average of the transverse width and thickness measurements of optional 10 determinants in the scanning electron microscopic (SEM) image of the sheet-like inorganic particles.

In addition, the method may include: 2) calculating the longer diameter and the thickness from the average particles diameter of secondary particles determined by laser diffraction scattering and the specific surface area measured by the BET method.

Further, the method may include: 3) actually measuring the longer diameter and the thickness by using an atomic force microscope.

(2) Aspect Ratio

As used herein, 'aspect ratio' refers to the ratio of the arithmetic average of longer diameter to the arithmetic average of thickness (arithmetic average of longer diameter/arithmetic average of thickness). Herein, the longer diameter and the thickness may be obtained by the above-mentioned method.

According to the present disclosure, the sheet-like inorganic particles may have an aspect ratio of 3.5 or more, or 4 or more, and 6 or less, 5.5 or less, or 5 or less. When the sheet-like inorganic particles satisfy the above-defined range of aspect ratio, it is possible to form a desired separator having high porosity.

(3) Content

According to the present disclosure, the sheet-like inorganic particles may be used in an amount of 20 parts by weight or more, 25 parts by weight or more, or 30 parts by weight or more, and 50 parts by weight or less, 45 parts by weight or les, or 40 parts by weight or less, based on 100 parts by weight of the slurry for forming a porous coating layer.

(4) Types

According to an embodiment of the present disclosure, the sheet-like inorganic particles may include $Al(OH)_3$, $AlO(OH)$, $Mg(OH)_2$, $BaTiO_3$, or two or more of them.

Meanwhile, according to an embodiment of the present disclosure, a particle-type binder polymer, not a non-particle binder polymer, is used, and such a particle-type binder polymer has a $D_{50}$ diameter of 200 nm or less. When using the binder polymer having a particle shape, not a non-particle shape, it is possible to ensure the porosity in the porous coating layer. In addition, when using a particle-type binder polymer having a predetermined diameter range, the particle-type binder polymer cannot infiltrate into the pores of the porous polymer substrate to prevent an increase in resistance advantageously.

For this purpose, the particle-type binder polymer has a $D_{50}$ diameter larger than the diameter of the pores of the porous polymer substrate. For example, the particle-type binder polymer may have a $D_{50}$ diameter of 80 nm or more, 90 nm or more, or 100 nm or more.

The particle-type binder polymer may include an acrylic particle-type binder (e.g. copolymer of butyl acrylate with ethylhexyl acrylate, copolymer of methyl methacrylate with ethylhexyl acrylate, polyacrylonitrile, polycyanoacrylate, etc.), acrylonitrile-butadiene-styrene rubber, styrene butadiene rubber (SBR), acrylonitrile-butadiene rubber, polyvinyl chloride, polyvinylidene fluoride, polyvinyl alcohol, polystyrene, or a mixture of two or more of them.

The particle-type binder polymer may be used in an amount of 10-50 parts by weight based on 100 parts by weight of the porous coating layer.

Meanwhile, in the porous coating layer according to an embodiment of the present disclosure, when the porous coating layer is divided into a top layer, an intermediate layer and a bottom layer in the thickness direction, the content of the particle-type binder polymer in the top layer is higher than the content of the particle-type binder polymer in the bottom layer.

Particularly, the top layer is the outermost layer, when porous coating layer is cut into n pieces in the thickness direction; the bottom layer is the layer facing the porous polymer substrate, when the porous coating layer is cut into n pieces in the thickness direction; the intermediate layer is the remaining layer except the top layer and the bottom layer in the porous coating layer; and n is an integer of 3-10.

Herein, the content of the particle-type binder polymer has a concentration gradient with which it increases from the bottom layer to the top layer based on the thickness direction of the porous coating layer, and the content of the inorganic particles has a concentration gradient with which it increases from the top layer to the bottom layer based on the thickness direction of the porous coating layer.

Herein, the intermediate layer in the porous coating layer has a gradual concentration gradient of the particle-type binder polymer, or has no specific concentration gradient.

In other words, the content of the particle-type binder polymer increases toward the top layer in the porous coating layer, while the content of the inorganic particles increases toward the bottom layer in the porous coating layer.

In other words, in the separator according to an embodiment of the present disclosure, the ratio of the content (A) of the particle-type binder polymer to the content (B) of the inorganic particles in the porous coating layer (content of particle-type binder polymer/content of inorganic particles (A/B)) increases toward the surface portion of the porous coating layer.

According to an embodiment of the present disclosure, the porous coating layer may be formed on one surface or both surfaces of the porous polymer substrate.

According to the present disclosure, the porous polymer substrate is a porous membrane and can provide a channel for transporting lithium ions, while insulating the negative electrode and the positive electrode electrically from each other to prevent a short-circuit. Any material may be used with no particular limitation, as long as it may be used conventionally as a material for a separator of an electrochemical device.

Particularly, the porous polymer substrate may be a porous polymer film substrate or a porous polymer nonwoven web substrate.

The porous polymer film substrate may be a porous polymer film including polyolefin, such as polyethylene or polypropylene. Such a polyolefin porous polymer film substrate realizes a shut-down function at a temperature of 80-130° C.

Herein, the polyolefin porous polymer film substate may be formed of polymers including polyolefin polymers, such as polyethylene, including high-density polyethylene, linear low-density polyethylene, low-density polyethylene or ultrahigh-molecular weight polyethylene, polypropylene, polybutylene, or polypentene, alone or in combination of two or more of them.

In addition, the porous polymer film substrate may be obtained by molding various polymers, such as polyesters, other than polyolefins, into a film shape. Further, the porous polymer film substrate may have a stacked structure of two or more film layers, wherein each film layer may be formed of polymers including the above-mentioned polymers, such as polyolefins or polyesters, alone or in combination of two or more of them.

In addition, the porous polymer film substrate and porous polymer nonwoven web substrate may be formed of polyethylene terephthalate, polybutylene terephthalate, polyester, polyacetal, polyamide, polycarbonate, polyimide, polyetherether ketone, polyether sulfone, polyphenylene oxide, polyphenylene sulfide, or polyethylene naphthalene, alone or in combination, besides the above-mentioned polyolefins.

Although there is no particular limitation in the thickness of the porous polymer substrate, the porous polymer substrate has a thickness of 1-100 μm, particularly 5-50 μm. As the batteries have been provided with high output/high capacity recently, it is advantageous to use a thin film as a porous polymer substrate. The porous polymer substrate may have a pore dimeter of 10-100 nm, 10-70 nm, 10-50 nm, or 10-35 nm, and a porosity of 5-90%, preferably 20-80%. However, according to the present disclosure, such numerical ranges may be changed with ease according to a particular embodiment, or as necessary.

The pores of the porous polymer substrate may include several types of pore structures. When any one of the average pore size determined by using a porosimeter and the average pore size observed through field emission-scanning electron microscopy (FE-SEM) satisfies the above-defined range, it falls within the scope of the present disclosure.

Herein, in the case of a generally known monoaxially oriented dry separator, the median pore size in the pore size of the transverse direction (TD), not the pore size of the machine direction (MD), determined through FE-SEM is taken as the standard pore size. In the case of the other porous polymer substrates (e.g. wet polyethylene (PE) separator) having a network structure, the pore size measured by using a porosimeter is taken as the standard pore size.

Although the thickness of the porous coating layer is not particularly limited, it may be 1-10 μm, particularly 1.5-6 μm. In addition, the porosity of the porous coating layer is not particularly limited, but it may be 35-65%, preferably.

The separator according to an embodiment of the present disclosure may further include other additives as ingredients of the porous coating layer, besides the above-described inorganic particles and binder polymer.

In still another aspect of the present disclosure, there is provided an electrochemical device including a positive electrode, a negative electrode and a separator interposed between the positive electrode and the negative electrode, wherein the separator is the above-described separator according to an embodiment of the present disclosure.

The electrochemical device includes any device which carries out electrochemical reaction, and particular examples thereof include all types of primary batteries, secondary batteries, fuel cells, solar cells or capacitors, such as super capacitor devices. Particularly, among the secondary batteries, lithium secondary batteries, including lithium metal secondary batteries, lithium-ion secondary batteries, lithium polymer secondary batteries or lithium-ion polymer secondary batteries, are preferred.

The two electrodes, positive electrode and negative electrode, used in combination with the separator according to the present disclosure are not particularly limited, and may be obtained by allowing electrode active materials to be bound to an electrode current collector through a method generally known in the art. Among the electrode active materials, non-limiting examples of a positive electrode active material include conventional positive electrode active materials that may be used for the positive electrodes for conventional electrochemical devices. Particularly, lithium manganese oxides, lithium cobalt oxides, lithium nickel oxides, lithium iron oxides or lithium composite oxides containing a combination thereof are used preferably. Non-limiting examples of a negative electrode active material include conventional negative electrode active materials that may be used for the negative electrodes for conventional electrochemical devices. Particularly, lithium-intercalating materials, such as lithium metal or lithium alloys, carbon, petroleum coke, activated carbon, graphite or other carbonaceous materials, are used preferably. Non-limiting examples of a positive electrode current collector include foil made of aluminum, nickel or a combination thereof. Non-limiting examples of a negative electrode current collector include foil made of copper, gold, nickel, copper alloys or a combination thereof.

The electrolyte that may be used in the electrochemical device according to the present disclosure is a salt having a structure of $A^+B^-$, wherein $A^+$ includes an alkali metal cation such as $Li^+$, $Na^+$, $K^+$ or a combination thereof, and B" includes an anion such as $PF_6^-$, $BF_4^-$, $Cl^-$, $Br^-$, $I^-$, $ClO_4^-$, $AsF_6^-$, $CH_3CO_2^-$, $CF_3SO_3^-$, $N(CF_3SO_2)_2^-$, $C(CF_2SO_2)_3^-$ or a combination thereof, the salt being dissolved or dissociated in an organic solvent including propylene carbonate (PC), ethylene carbonate (EC), diethyl carbonate (DEC), dimethyl carbonate (DMC), dipropyl carbonate (DPC), dimethyl sulfoxide, acetonitrile, dimethoxyethane, diethoxyethane, tetrahydrofuran, N-methyl-2-pyrrolidone (NMP), ethyl methyl carbonate (EMC), gamma-butyrolactone (γ-butyrolactone) or a combination thereof. However, the present disclosure is not limited thereto.

Injection of the electrolyte may be carried out in an adequate step during the process for manufacturing a battery depending on the manufacturing process of a final product and properties required for a final product. In other words, injection of the electrolyte may be carried out before the assemblage of a battery or in the final step of the assemblage of a battery.

The method for manufacturing a separator for a lithium secondary battery according to the present disclosure is not particularly limited. However, the separator may be obtained by the following method or any conventional method known to those skilled in the art.

According to an embodiment of the present disclosure, the separator may be obtained by introducing a particle-type binder polymer to a solution containing inorganic particles and a dispersant dispersed in a solvent to prepare slurry for forming a porous coating layer, and applying the slurry onto a porous polymer substrate, followed by drying, to form a porous coating layer.

For example, according to an embodiment of the present disclosure, when the slurry for forming a porous coating layer is applied to a porous polymer substrate and the solvent is dried, phase separation may occur. Particularly, phase separation occurs depending on a difference in density in a single porous coating layer, while the solvent is dried, and thus it is possible to provide a separator in which the portion adjacent to the porous polymer substrate is enriched with the inorganic particles, and the outermost portion of the porous coating layer is enriched with the binder polymer.

Meanwhile, when a multilayer-type porous coating layer is formed by carrying out sequential coating of the slurry for forming a porous coating layer on the porous polymer substrate, the coating solution may be in contact with one dried coating layer to cause separation from the coating layer, resulting in the problem of significant degradation of adhesion.

According to the present disclosure, the slurry for forming a porous coating layer may have a viscosity of 200 cP or less, 150 cP or less, 100 cP or less, or 20 cP or less, and 5 cP or more, 8 cP or more, or 10 cP or more. Within the above-defined range, interlayer separation between the inorganic particles and the binder polymer may occur smoothly so that a separator having high porosity may be formed.

The viscosity of the slurry may be determined by using a vibration-type viscometer or E-type viscometer.

The slurry may include a dispersant added suitably thereto in order to prevent aggregation of the inorganic particles.

The inorganic particles may be dispersed by using a method generally known to the those skilled in the art. For example, an ultrasonic disperser, a ball mill, a bead mill, a disperser, a mixer, or the like, may be used, and particularly, a ball mill or a bead mill is used preferably. Herein, the dispersion treatment time may vary depending on the volume to be treated, but may be suitably 1-20 hours. The particle size of the pulverized particles may be controlled depending on the size of beads used in the ball mill or bead mill, or the ball milling (or bead milling) time.

Although there is no particular limitation in the process for coating the slurry for forming a porous coating layer onto the porous polymer substrate, it is preferred to use a slot coating or dip coating process. A slot coating process includes coating a slurry supplied through a slot die onto the whole surface of a substrate and is capable of controlling the thickness of a coating layer depending on the flux supplied from a metering pump. In addition, a dip coating process includes dipping a substrate into a tank containing a slurry to carry out coating and is capable of controlling the thickness of a coating layer depending on the concentration of the slurry and the rate of removing the substrate from the tank. Further, in order to control the coating thickness more precisely, it is possible to carry out post-metering through a Mayer bar or the like, after dipping.

Then, the porous polymer substrate coated with the slurry for forming a porous coating layer may be dried in a dryer, such as an oven, to form a porous coating layer on at least one surface of the porous polymer substrate.

The drying may be carried out in a drying chamber, wherein the condition of the drying chamber is not particularly limited due to the application of a non-solvent.

The drying step may be carried out under a relative humidity of 30% or more, 35% or more, or 40% or more, and 80% or less, 75% or less, or 70% or less. For example, the drying step may be carried out under a relative humidity of 40-80%. In addition, the drying step may be carried out at a temperature of 20-70° C. for 0.1-2 minutes.

According to the present disclosure, the solid content (slurry for forming a porous coating layer free from the solvent) may be 10 parts by weight or more, 15 parts by weight or more, or 20 parts by weight or more, and 40 parts by weight or less, 35 parts by weight or less, or 30 parts by weight or less, based on 100 parts by weight of the slurry for forming a porous coating layer.

According to an embodiment of the present disclosure, the solvent may be an aqueous solvent or an organic solvent.

The solvent that may be used herein preferably has a solubility parameter similar to the solubility parameter of the particle-type binder polymer to be used and a low boiling point. This is because such a solvent facilitates homogeneous mixing and the subsequent solvent removal.

For example, when the solvent is an organic solvent, the binder polymer is dissolved in the organic solvent.

In this case, non-limiting examples of the organic solvent include any one selected from acetone, tetrahydrofuran, methylene chloride, chloroform, dimethyl formamide, N-methyl-2-pyrrolidone, methyl ethyl ketone and cyclohexane, or a mixture of two or more of them.

For example, when the solvent is an aqueous solvent, the binder polymer may be particles dispersed in the solvent, and the separator may further include a separate adhesive layer on the porous coating layer in order to enhance adhesion to an electrode.

In this case, non-limiting examples of the aqueous solvent include at least one selected from water, methanol, ethanol, propyl alcohol, butyl alcohol, butanediol, ethylene glycol, propylene glycol and tripropylene glycol.

Further, the separator according to the present disclosure may satisfy at least three formulae of the following formulae:

Increase in air permeation time≤100%
Heat shrinkage≤10%
Adhesion to electrode≥70 gf/25 mm
Viscosity of slurry for forming porous coating layer≤20 cp, wherein 'Increase in air permeation time' is calculated by the formula of [(Air permeation time of porous polymer substrate-Air permeation time of separator)/(Air permeation time of porous polymer substrate)]×100, and 'Heat shrinkage' is defined as the smaller value of the heat shrinkage in the machine direction (MD) and the heat shrinkage in the transverse direction (TD) and is calculated by the formula of [(Initial length–Length after heat shrinking at 150° C./min for 30 minutes)/(Initial length)]×100.

Examples will be described more fully hereinafter so that the present disclosure can be understood with ease. The following examples may, however, be embodied in many different forms and should not be construed as limited to the exemplary embodiments set forth therein. Rather, these exemplary embodiments are provided so that the present disclosure will be thorough and complete, and will fully convey the scope of the present disclosure to those skilled in the art.

Example 1

First, sheet-like aluminum hydroxide (average particle diameter: 800 nm, available from Huber) as inorganic particles and poly(ethylene glycol)-block-poly(acrylic acid) (available from BYK) as a dispersant were introduced to water and agitated homogeneously therein, and then an acrylic particle-type binder (available from Zeon) as a particle-type binder polymer was introduced sequentially to prepare slurry for forming a porous coating layer. The slurry had a weight ratio of the inorganic particle to the particle-type binder polymer of 70:30. In addition, the weight ratio of the inorganic particles to the dispersant was 99.5:0.5. The slurry was applied onto one surface of a polyethylene porous substrate by using a doctor blade, followed by drying, to prepare a separator having a porous coating layer. This is shown in Table 1. FIG. 1 shows a scanning electron microscopic (SEM) image of the separator according to Example 1.

Comparative Example 1

Figure 2:
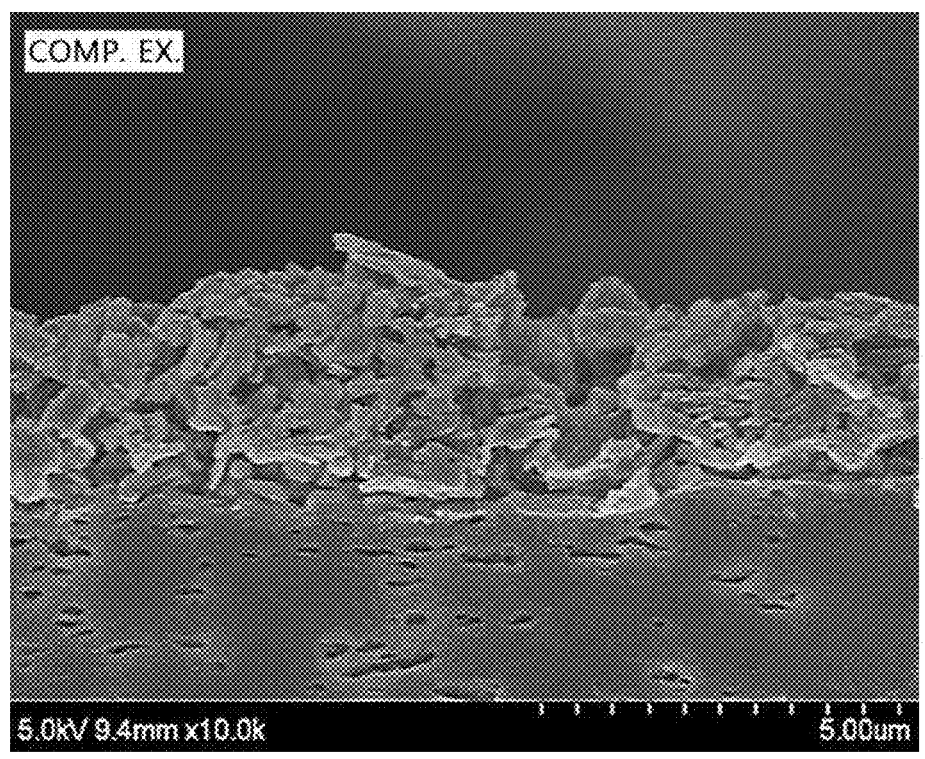
FIG. 2 and FIG. 3 are SEM images of the separators according to Comparative Examples 1 and 2.

A separator was obtained in the same manner as Example 1, except that carboxymethyl cellulose (CMC, available from GL Chem) was used instead of poly(ethylene glycol)-block-poly(acrylic acid) as a dispersant. This is shown in Table 1. FIG. 2 shows an SEM image of the separator according to Comparative Example 1.

Comparative Example 2

Figure 3:
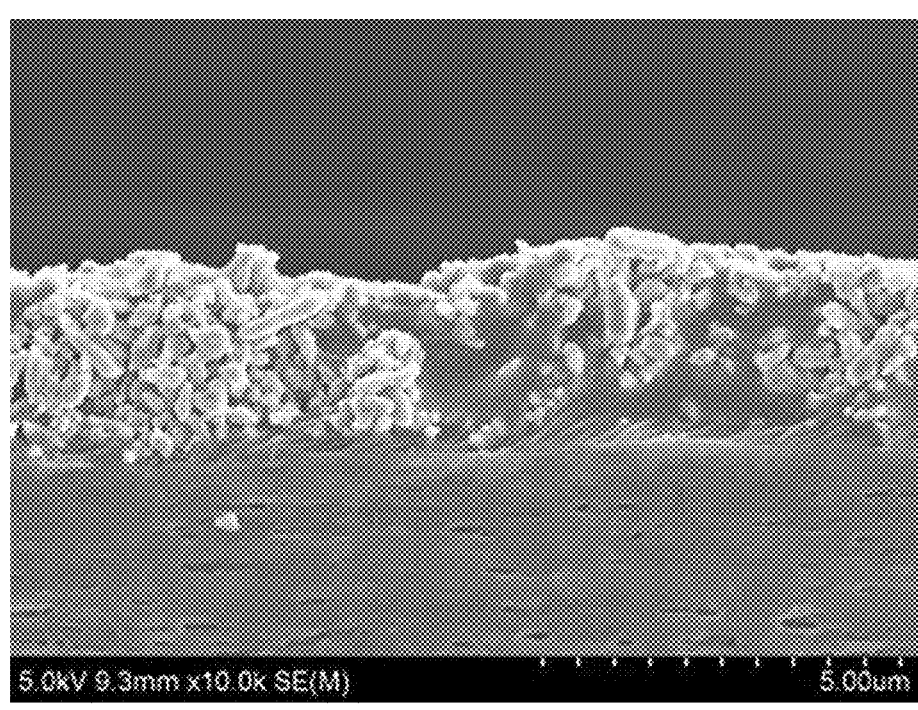
Figure 4:
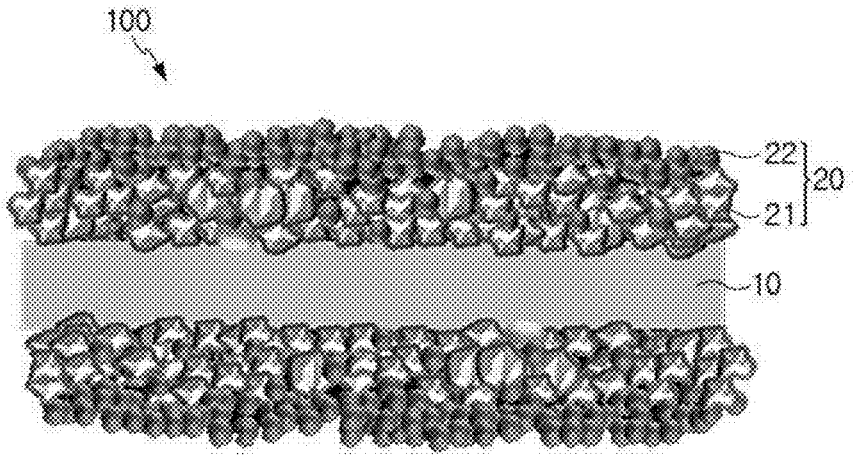
FIG. 4 is a schematic sectional view illustrating the separator according to an embodiment of the present disclosure.

A separator was obtained in the same manner as Example 1, except that alumina ($Al_2O_3$, average particle diameter: 600 nm, available from Alteo) as spherical inorganic particles was used instead of the sheet-like inorganic particles, and carboxymethyl cellulose (CMC, available from GL Chem) was used instead of poly(ethylene glycol)-block-poly (acrylic acid) as a dispersant. This is shown in Table 1. FIG. 3 shows an SEM image of the separator according to Comparative Example 2.

Comparative Example 3

A separator was obtained in the same manner as Example 1, except that polyethylene glycol (available from Aldrich) merely having a glycol functional group was used instead of poly(ethylene glycol)-block-poly(acrylic acid) as a dispersant. This is shown in Table 1.

Comparative Example 4

A separator was obtained in the same manner as Example 1, except that poly acrylic acid (available from Aldrich) merely having a carboxyl functional group was used instead of poly(ethylene glycol)-block-poly(acrylic acid) as a dispersant. This is shown in Table 1.

TABLE 1

| | Inorganic particles | Type of dispersant | Content of inorganic particles | Content of particle-type binder polymer | Viscosity of slurry (cP) | Air permeation time (sec/100 mL) | Increase in air permeation time (%) | Adhesion to electrode (gf/25 mm) | Heat shrinkage (%) (MD/TD) | Remarks |
|---|---|---|---|---|---|---|---|---|---|---|
| Ex. 1 | Sheet-like | Poly (ethylene glycol)-block-poly (acrylic acid) | 70 wt % | 30 wt % | 12 cP | 121 | 73% | 120 gf/ 25 mm | 3/5 | |
| Comp. Ex. 1 | Sheet-like | Carboxy methyl cellulose | 70 wt % | 30 wt % | 110 cP | 160 | 129% | 40 gf/ 25 mm | 10/20 | |
| Comp. Ex. 2 | Spherical | Carboxy methyl cellulose | 70 wt % | 30 wt % | 80 cP | 107 | 206% | 10 gf/ 25 mm | 15/20 | |
| Comp. Ex. 3 | Sheet-like | Poly ethylene glycol | 70 wt % | 30 wt % | Inorganic particles cannot be dispersed and coating is not allowed | | | | | glycol |
| Comp. Ex. 4 | Sheet-like | Poly acrylic acid | 70 wt % | 30 wt % | 80 cP | 110 | 80% | 60 gf/ 25 mm | 26/30 | COOH |

When using a dispersant containing both carboxyl and glycol groups in the case of Example 1 in Table 1, the separator shows a low increase in air permeation time of 73%, high adhesion to an electrode and a low heat shrinkage.

On the contrary, when using carboxymethyl cellulose as a dispersant in the case of Comparative Examples 1 and 2, each separator shows a significantly higher increase in air permeation time as compared to Example 1, and reduced adhesion to an electrode and poor heat shrinkage as compared to Example 1.

When using a dispersant merely having a glycol group in the case of Comparative Example 3, the inorganic particles cannot be dispersed and coating is not allowed.

When using a dispersant merely having a carboxyl group in the case of Comparative Example 4, the separator shows low adhesion to an electrode and poor heat shrinkage as compared to Example 1.

Test Methods

1) Method for Determination of Thickness

The thickness of a separator was determined by using a thickness gauge (VL-50S-B, available from Mitutoyo).

2) Method for Determination of Viscosity of Slurry for Forming Porous Coating Layer The viscosity of 100 cc of slurry for forming a porous coating layer was determined by using DV 2T viscometer (Brookfield viscometer) at 25° C.

3) Method for Determination of Air Permeation Time

An air permeation time tester (EG01-55-1MR, available from Asahi Seiko) was used to determine the time (sec) required for 100 mL of air to pass through a separator under a constant pressure (0.05 MPa). The air permeation time was recorded as average of values determined at 3 points including 1 point of each of the left side/center/right side.

4) Method for Determination of Adhesion (Lami Strength) Between Electrode and Separator To determine the adhesion (Lami strength) between an electrode and a separator, a negative electrode was prepared as follows.

First, artificial graphite, carbon black, carboxymethyl cellulose (CMC) and styrene butadiene rubber (SBR) were mixed at a weight ratio of 96:1:2:2 with water to prepare a negative electrode slurry. The negative electrode slurry was applied to copper foil at a capacity of 3.5 mAh/cm² and dried at 130° C. for 3 hours or more, followed by pressing, to obtain a negative electrode.

The resultant negative electrode was cut into a size of 25 mm×100 mm. In addition, each of the separators obtained according to Example and Comparative Examples was cut into a size of 25 mm×100 mm. The separator was stacked with the negative electrode, and the stack was inserted between PET films having a thickness of 100 μm and adhered by using a flat press. Herein, the flat press was heated and pressurized at 60° C. under a pressure of 6.5 MPa for 1 second. The adhered separator and negative electrode were attached to slide glass by using a double-sided tape. The end portion (10 mm or less from the end of the adhered surface) of the separator was peeled off and attached to a 25 mm×100 mm PET film by using a single-sided tape so that they might be connected in the longitudinal direction. Then, the slide glass was mounted to the lower holder of a UTM instrument (LLOYD Instrument LF Plus), and the PET film adhered to the separator was mounted to the upper holder of the UTM instrument. Then, force was applied at 180° and a rate of 300 mm/min. The force required for separating the negative electrode from the porous coating layer facing the negative electrode was measured.

5) Method for Determination of Heat Shrinkage

The heat shrinkage of a separator was calculated according to the formula of [(Initial length−Length after heat shrinking at 150° C./min)/(Initial length)]×100

Herein, each of the heat shrinkage in the machine direction (MD) and the heat shrinkage in the transverse direction (TD) was determined.

6) Average Particle Diameter ($D_{50}$) of Inorganic Particles Contained in Slurry The average particle diameter of inorganic particles contained in slurry was determined by using a particle size analyzer (MASTERSIZER 3000, available from Malvern).

7) Proportion of Particle-Type Binder Polymer in Porous Coating Layer

The proportion of a particle-type binder polymer in a porous coating layer was determined by X-ray diffractometry and energy dispersive X-ray analysis.

DESCRIPTION OF MAIN ELEMENTS

100: Separator
10: Porous polymer substrate
20: Porous coating layer
21: Inorganic particles
22: Particle-type binder polymer

What is claimed is:

1. A separator for a lithium secondary battery, comprising:
a porous polymer substrate; and
a porous coating layer on at least one surface of the porous polymer substrate,
wherein the porous coating layer comprises inorganic particles, a particulate binder polymer, and a dispersant,
wherein the dispersant comprises a copolymer comprising a carboxyl functional group and a glycol functional group,
wherein the porous coating layer comprises a top layer, an intermediate layer, and a bottom layer in a thickness direction, and
wherein an amount of the particulate binder polymer present in the top layer is higher than an amount of the particulate binder polymer present in the bottom layer.

2. The separator for the lithium secondary battery according to claim 1, wherein the top layer is an outermost layer of the porous coating layer, when the porous coating layer is viewed in the thickness direction away from the porous polymer substrate;
wherein the bottom layer faces the porous polymer substrate, when the porous coating layer is viewed in the thickness direction; and
wherein the intermediate layer is between the top layer and the bottom layer in the porous coating layer.

3. The separator for the lithium secondary battery according to claim 2, wherein a concentration gradient of the particulate binder polymer increases from the bottom layer to the top layer in the thickness direction of the porous coating layer, and a concentration gradient of the inorganic particles increases from the top layer to the bottom layer in the thickness direction of the porous coating layer.

4. The separator for the lithium secondary battery according to claim 1, wherein the intermediate layer in the porous coating layer has a gradual concentration gradient of the particulate binder polymer, or has no concentration gradient.

5. The separator for the lithium secondary battery according to claim 1, wherein a weight ratio of the inorganic particles to the dispersant is from 99.5:0.5 to 95:5.

6. The separator for the lithium secondary battery according to claim 1, wherein the amount of the particulate binder polymer is 10 parts by weight to 50 parts by weight based on 100 parts by weight of the porous coating layer.

7. The separator for the lithium secondary battery according to claim 1, wherein the dispersant has a ratio of an equivalent number of glycol functional groups to an equivalent number of carboxyl functional groups of 0.05 to 0.25.

8. The separator for the lithium secondary battery according to claim 1, wherein the dispersant has a weight average molecular weight of 100 to 10,000.

9. The separator for the lithium secondary battery according to claim 1, wherein the dispersant is a copolymer of polyacrylic acid and polyethylene glycol.

10. The separator for the lithium secondary battery according to claim 9, wherein the dispersant is a block copolymer of polyacrylic acid and polyethylene glycol.

11. The separator for the lithium secondary battery according to claim 1, wherein the porous coating layer has a thickness of 2 μm to 10 μm.

12. The separator for the lithium secondary battery according to claim 1, wherein the inorganic particles are planar inorganic particles.

13. The separator for the lithium secondary battery according to claim 12, wherein the planar inorganic particles have an aspect ratio of 3.5 or more.

14. The separator for the lithium secondary battery according to claim 12, wherein the planar inorganic particles comprise at least one of $Al(OH)_3$, $AlO(OH)$, $Mg(OH)_2$ and $BaTiO_3$.

15. The separator for the lithium secondary battery according to claim 1, wherein the separator satisfies at least three the following formulae:
(i) increase in air permeation time≤100%,
(ii) heat shrinkage≤10%,
(iii) adhesion to electrode≥70 gf/25 mm, and
(iv) viscosity of a slurry for forming the porous coating layer≤20 cp,
wherein the increase in air permeation time is calculated by the formula of [(air permeation time of porous polymer substrate−air permeation time of separator)/(air permeation time of porous polymer substrate)]×100, and
wherein the heat shrinkage is a smaller value of a heat shrinkage in the machine direction (MD) and the heat shrinkage in the transverse direction (TD) and is calculated by the formula of [(initial length−length after heat shrinking at 150° C./min for 30 minutes)/(initial length)]×100.

16. A lithium secondary battery, comprising:
a positive electrode,
a negative electrode, and
a separator interposed between the positive electrode and the negative electrode,
wherein the separator is the same as defined in claim 1.

17. A method for manufacturing the separator for the lithium secondary battery as defined in claim 1, comprising:
a step of applying a slurry for forming the porous coating layer comprising a solvent, the inorganic particles, the particulate binder polymer and the dispersant to at least one surface of the porous polymer substrate, followed by drying,
wherein the slurry for forming the porous coating layer has a viscosity of 200 cP or less, and
wherein the slurry for forming the porous coating layer has a solid content of 10 parts by weight to 40 parts by weight based on 100 parts by weight of the slurry.

18. The method for manufacturing the separator according to claim 17,
wherein the solvent is water,
wherein the particulate binder polymer is in the form of particles dispersed in the solvent, and
wherein phase separation is carried out in the drying step.

19. A method for manufacturing the separator for the lithium secondary battery as defined in claim 1, wherein the top layer is an outermost layer of the porous coating layer away from the porous polymer substrate in the thickness direction.

20. A method for manufacturing the separator for the lithium secondary battery as defined in claim 1, wherein the dispersant is a block copolymer of polyacrylic acid and polyethylene glycol, and wherein the dispersant has a ratio of an equivalent number of glycol functional groups to an equivalent number of carboxyl functional groups of 0.05 to 0.25.

20

* * * * *